United States Patent [19]

Muragishi et al.

[11] Patent Number: 5,167,687
[45] Date of Patent: Dec. 1, 1992

[54] METHOD FOR LAMINATING AND BONDING FLAT ELECTRODES

[75] Inventors: Isao Muragishi; Takashi Kanehisa, both of Osaka; Takashi Suzuki, Toyonaka; Tetsuo Hori, Kawachinagano, all of Japan

[73] Assignee: Matsushita Electric Industrial Co., Ltd., Osaka, Japan

[21] Appl. No.: 643,932

[22] Filed: Jan. 22, 1991

[30] Foreign Application Priority Data

Jan. 22, 1990 [JP] Japan .................... 2-12945

[51] Int. Cl.⁵ .................... C03C 10/00; C03B 23/20
[52] U.S. Cl. .................... 65/33; 65/41; 65/58; 65/36
[58] Field of Search ............ 156/89; 65/32.1, 32.3, 65/33, 58, 36

[56] References Cited

U.S. PATENT DOCUMENTS

| | | | |
|---|---|---|---|
| 2,889,952 | 6/1959 | Claypoole | 65/33 |
| 3,195,030 | 7/1965 | Herczog et al. | 65/33 |
| 3,225,132 | 12/1965 | Baa et al. | 65/33 |
| 3,768,991 | 10/1973 | Rogers . | |
| 3,862,830 | 1/1975 | Stern | 65/58 |

OTHER PUBLICATIONS

Patent Abstract of Japan, unexamined application, E Field, vol. 12 (174) p. 147 E612, May 24, 1988 (Kokai 62-283523).
Patent Abstract of Japan, unexamined applications, E field vol. 10 (379) p. 37 E465, Dec. 18, 1986 (Kokai 61-171030).
Patent Abstract of Japan, unexamined application, E field vol. 12 (174) p. 147 E612, May 24, 1988 (Kokai 62-283523).
Patent Abstract of Japan, unexamined applications, E field vol. 12 (337) p. 149 E657, Sep. 12, 1988 (Kokai 63-102138).

Primary Examiner—Kenneth M. Schor
Assistant Examiner—Brenda Lamb
Attorney, Agent, or Firm—Wenderoth, Lind & Ponack

[57] ABSTRACT

According to the bonding method of flat electrodes of the present invention, a crystal glass material is arranged between electrodes, heated, and melted while the flat electrodes are pressured, and the melted crystal glass material is fused and re-crystallized to the surface of each flat electrode, so that the flat electrodes can be bonded with strong bonding force. Since a plate-like spacer or an application glass of a low melting point is not used in the method, disadvantages resulting from the spacer or the glass can be removed.

1 Claim, 5 Drawing Sheets

METHOD FOR LAMINATING AND BONDING FLAT ELECTRODES

BACKGROUND OF THE INVENTION

The present invention relates to a method for laminating and bonding flat electrodes for use in a plane display device, etc.

With reference to FIG. 5, in order to laminate and bond a plurality of flat electrodes with a predetermined distance spaced from one another in the electrically-insulated state for a plane display device displaying a color television image by electron beams, conventionally, a glass (c) having a low melting point and mixed with an organic binder such as nitrocellulose or the like is applied through printing onto the front and rear surfaces of a plate-like spacer (b) made of a metallic plate coated with an insulating film. The plate-like spacer (b) of approximately the same size as a flat electrode (a) to be bonded has openings (not shown) at positions corresponding to where electron beams pass through the flat electrode (a). A spherical spacer (d), for example, a glass bead or a glass fiber is mixed in the glass (c). The plate-like spacer (b) applied with the above-described glass (c) is interposed between the confronting flat electrodes (a) and (a), and each flat electrode (a) and plate-like spacer (b) are positioned by a positioning pin (e), which are placed on a baking base (f). The flat electrodes holding the plate-like spacer (b) therebetween are pressed between the baking base (f) and a stamper (g), and then are to the low melting point of the glass (c) in a baking furnace (h). In the state where the distance between the electrodes (a) and (a) is kept a predetermined value by the plate-like spacer (b) and the spherical spacer (d), the electrodes (a) and (a) are bonded by the glass (c).

In the conventional bonding method as above, the plate-like spacer (b) is interposed generally all over the area covering the flat electrodes. Therefore, the capacitance between the flat electrodes is disadvantageously increased, thereby causing an electric circuit to generate heat.

Moreover, the organic binder mixed in the glass is remains within the applied glass even after the flat electrodes are bonded, whereby the degree of vacuum between the flat electrodes is prone to be decreased by this remaining organic binder.

SUMMARY OF THE INVENTION

An essential object of the present invention is to provide a method for laminating and bonding flat electrodes, whereby the flat electrodes can be laminated and bonded without employing a plate-like spacer or an application glass of a low melting point between the flat electrodes as in the prior art, with elimination of the above-described disadvantages inherent in the prior art method.

In accomplishing the above-described object, according to an aspect of the present invention, there is provided a method for laminating and bonding flat electrodes, comprising the steps of: arranging a crystal glass material between a plurality of flat electrodes; and heating and melting said crystal glass material while said flat electrodes are pressured, so that said crystal glass material is re-crystallized, whereby said flat electrodes are bonded.

In the above-described method, it is more suitable to employ an amorphous glass material as well which is softened in the highly viscous state at a melting temperature of the crystal glass material.

According to the above methods, the flat electrodes can be firmly laminated and bonded with one another since the melted crystal glass material is fused on the surface of each flat electrode while the flat electrodes are pressed, so that the crystal glass material is re-crystallized.

Since the flat electrodes can be bonded without using a plate-like spacer or an application glass of a low melting point as in the prior art, various conventional disadvantages resulting from the plate-like spacer or application glass can be removed.

It is to be noted here that the crystal glass material in the melting state has low viscosity, making it difficult to prevent a gap or distance between the pressured flat electrodes from being narrowed. It becomes accordingly necessary to maintain the gap or distance between the flat electrodes until the crystal glass material is re-crystallized. As such, if an amorphous glass material which is softened in the highly viscous state at the melting temperature of the crystal glass material is also employed, it becomes possible because of the highly viscous state of the amorphous glass material to prevent the gap between the flat electrodes from being narrowed. Moreover, this amorphous glass material after being hardened contributes to an improvement of the bonding force of the flat electrodes.

BRIEF DESCRIPTION OF THE DRAWINGS

This and other objects and features of the present invention will become apparent from the following description taken in conjunction with one preferred embodiment thereof with reference to the accompanying drawings, in which.

DETAILED DESCRIPTION OF A PREFERRED EMBODIMENT

Figure 1:
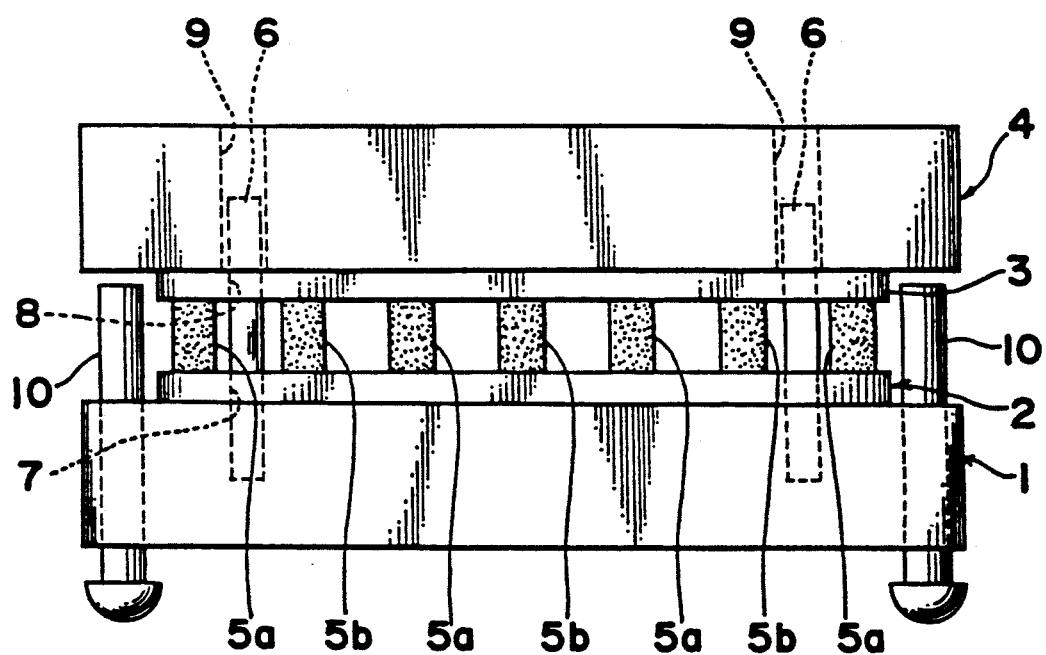
FIG. 1 is a side elevational view explanatory of a bonding method of flat electrodes according to a preferred embodiment of the present invention.

Before the description of the present invention proceeds, it is to be noted here that like parts are designated by like reference numerals throughout the accompanying drawings.

Figure 2:
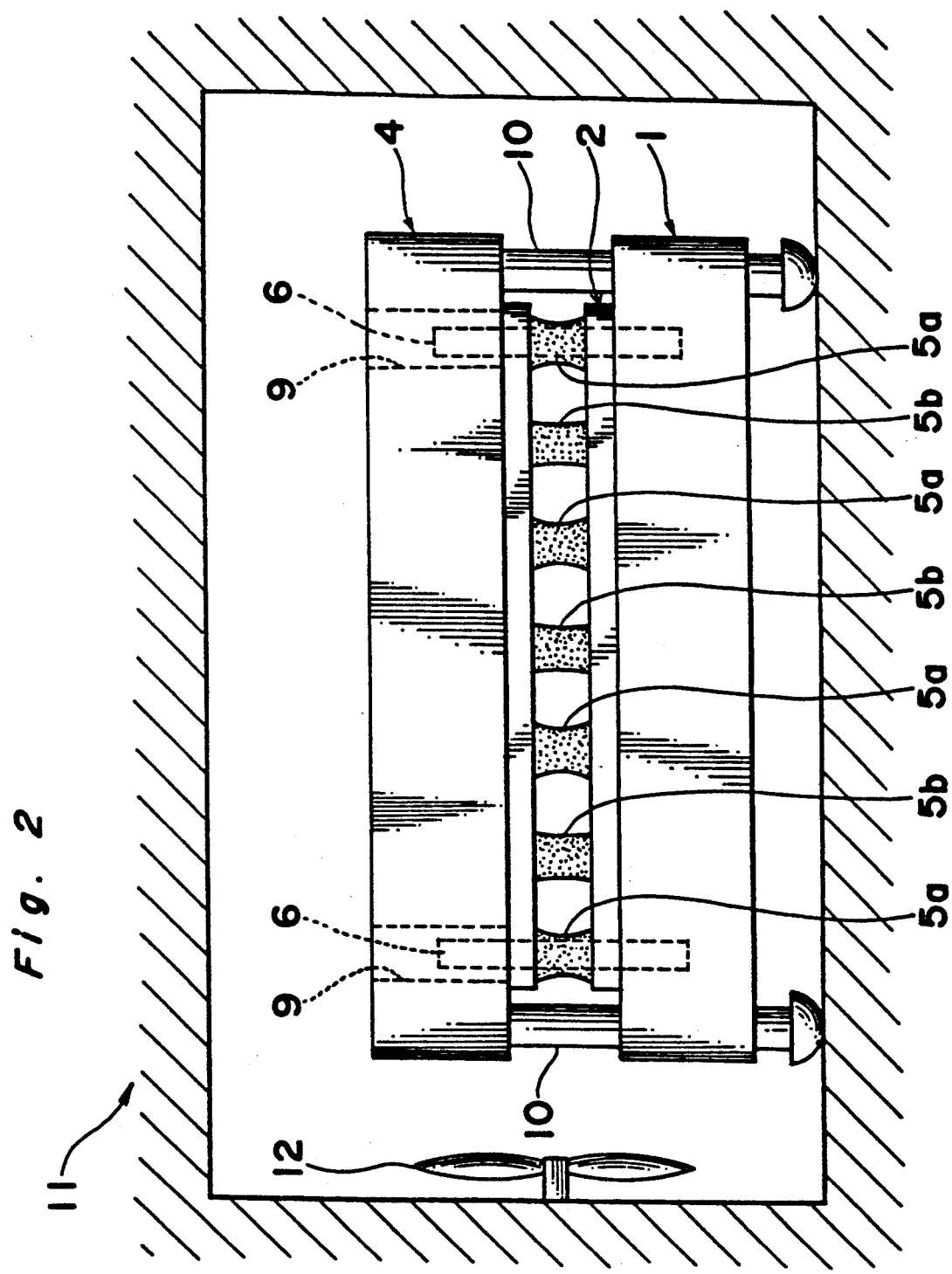
FIG. 2 is a side elevational view showing the heating state of the flat electrodes.
Figure 3:
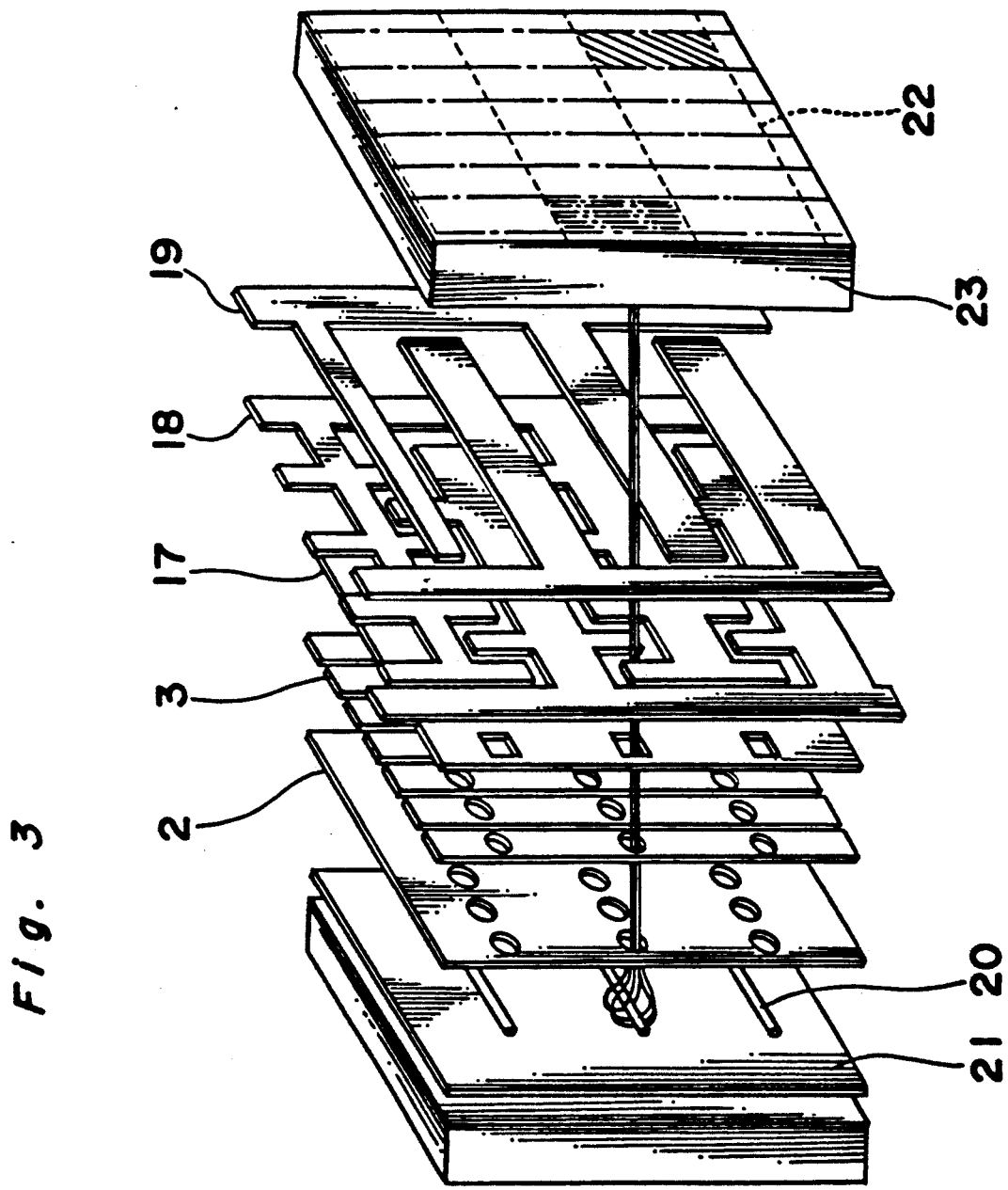
FIG. 3 is an exploded perspective view showing the structure of a plane display device.

FIGS. 1-3 illustrate a preferred embodiment of the present invention applied to laminate and bond flat electrodes in a plane display device.

A beam pick-up electrode (flat electrode) 2 and a signal electrode (flat electrode) 3 are piled on a baking base 1, with a stamper 4 overlapped thereabove. A crystal glass rod (crystal glass material) 5a and an amorphous glass rod (amorphous glass material) 5b are alternately arranged in parallel relation to each other between the electrodes 2 and 3. The thickness of the crystal glass rod 5a is slightly larger than a predetermined distance between the electrodes 2 and 3. On the other hand, the thickness of the amorphous glass rod 5b is generally the same as the above predetermined distance between the electrodes 2 and 3. These rods 5a and 5b are arranged in such a manner as not to interrupt the portions of the electrodes 2 and 3 where electron beams pass through.

The crystal glass rod 5a employed in the present embodiment is constituted of 70 mol % of PbO, 24 mol % of $B_2O_2$, 4 mol % of ZnO, and the remaining of $SiO_2$ and $Al_2O_3$.

The crystal glass rod 5a melts at 450° C. Meantime, the amorphous glass rod 5b employed in the present embodiment is constituted of 50 mol % of $B_2O_3$, 40 mol % of PbO, and the remaining of $Na_2O$ and $K_2O$. A transition point of the amorphous glass rod 5b is 383° C. (viscosity: $10^{13.3}$ poise) and a softening point thereof is 506° C. (viscosity: $10^{7.65}$ poise).

Positioning pins 6 are erected at four corners of the baking base 1 so as to position the beam pick-up electrode 2, the signal electrode 3, and the stamper 4 in a horizontal direction. These positioning pins 6, passing through respective positioning holes 7 and 8 formed in the beam pick-up electrode 2 and the signal electrode 3, are fitted into fitting holes 9 of the stamper 4. The stamper 4 is movable up and down to the baking base 1 while the positioning pins 6 are fitted into the fitting holes 9. A plurality of props 10 are projected upward in the periphery of the baking base 1. When an upper end of each prop 10 contacts the lower surface of the stamper 4, the downward movement of the stamper 4 is restricted.

The thus-assembled body is heated to the melting point of the crystal glass rod 5a within a baking furnace 11, so that the crystal glass rod 5a is melted. The temperature is maintained until the melted crystal glass rod 5a is re-crystallized. Thereafter, the baking furnace 11 is cooled. It is to be noted that the temperature within the furnace 11 is made uniform by the agitating operation of a fan 12, as shown in FIG. 2.

As indicated in FIG. 2, the melted crystal glass rod 5a is pressed and crushed by the load of the stamper 4 against the surfaces of the electrodes 2 and 3, so that the crystal glass rod 5a is fused to the electrodes 2 and 3. Accordingly, tho electrodes 2 and 3 can be tightly laminated and bonded.

However, since the viscosity of the crystal glass rod 5a is lowered in the melting state, it is difficult to retain the predetermined distance between the electrodes 2 and 3 in the pressured state. Although the distance between the stamper 4 and baking base 1 is maintained constant by the props 10 according to the present embodiment, it may happen that the signal electrode 3 comes downward or locally bends by its own weight, and thus it is possible that the distance between the electrodes 2 and 3 is narrowed.

On the other hand, the amorphous glass rod 5b employed in the present embodiment has a high viscosity, approximately $10^9$ poise, in the softening state at the melting temperature of the crystal glass rod 5a, whereby the distance between the electrodes 2 and 3 can be prevented from being narrowed. As a result, the beam pick-up electrode 2 and the signal electrode 3 can be tightly bonded with good accuracy with the predetermined distance kept therebetween.

In a plane display device shown in FIG. 3, the beam pick-up electrode 2, the signal electrode 3, a horizontal focusing electrode 17, a horizontal deflecting electrode 18, and a vertical deflecting electrode 19 are bonded with each other by the above-described present method, and sealed into a glass container 23, in the vacuum state, having a screen 22 together with a filamentary cathode 20 as an electron beam source and a back plate 21 arranged at the rear of the cathode 20.

According to the present embodiment, in the case where the beam pick-up electrode 2 and the signal electrode 3 are bonded with the other flat electrodes in the same manner as above, or when the bonded electrode unit is sealed within the glass container 23, the viscosity of the amorphous glass rod 5b is kept high even though the rod 5b is softened at that time, and therefore the amorphous glass rod 5b is not allowed to leak from between the flat electrodes.

Figure 4:
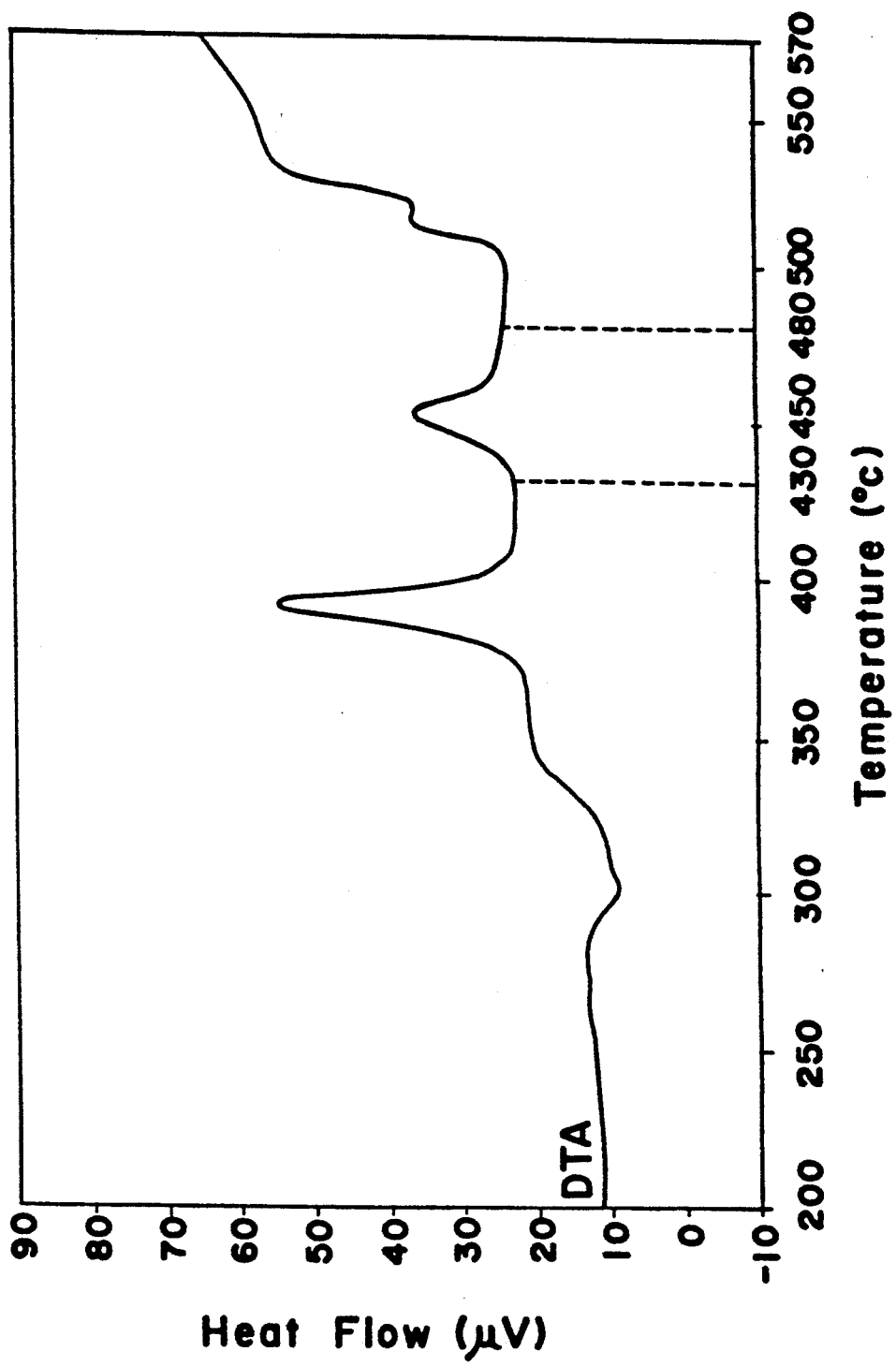
FIG. 4 is a graph of the differential thermal analysis of a crystal glass material employed in the method according to the preferred embodiment of the present invention.
Figure 5:
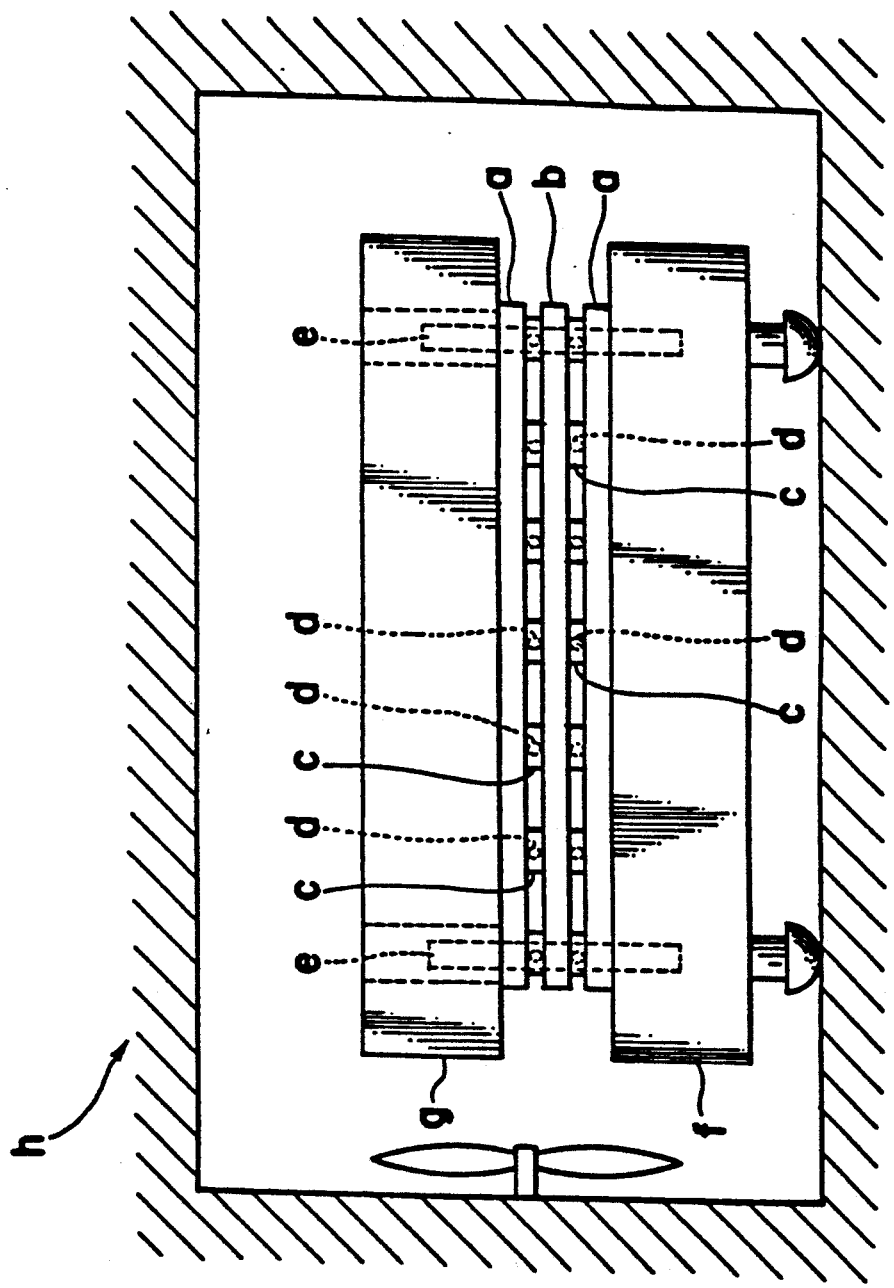
FIG. 5 is a side elevational view explanatory of a conventional bonding method of flat electrodes.

The result of the differential thermal analysis of the crystal glass rod 5a is indicated in a graph of FIG. 4. A peak is observed at 390° C. and 450° C. 390° C. is not enough to obtain a hard crystal, while the crystal glass rod 5a is re-crystallized best at 430°–480° C. around 450° C. Therefore, it is found that the strong bonding force is realized at 430°–480° C. If a critical point of the amorphous glass rod 5b is not lower than 480° C., the viscosity thereof is too high to crush the same. Furthermore, if an amorphous glass rod 5b having a softening point not higher than 400° C. is employed, the amorphous glass rod 5b readily leaks out from between the flat electrodes in bonding the other flat electrodes or in sealing into the glass container 23.

The present invention is not restricted to the foregoing embodiment, but can be applicable to various other embodiments. For example, each glass material is heated to the operating temperature by the use of a heating plate or the like instead of the baking furnace.

As is described hereinabove, the present invention enables bonding of flat electrodes by a crystal glass material without using a plate-like spacer or an application glass as used in the prior art. Therefore, such disadvantages as the heat generation of an electric circuit due to the plate-like spacer or the deterioration of the degree of vacuum resulting from the organic binder in the application glass can be eliminated.

Besides, since the amorphous glass material is also used, the flat electrodes can be bonded in the state where the distance between the electrodes is kept with good accuracy.

Although the present invention has been fully described by way of example with reference to the accompanying drawings, various changes and modifications would be apparent to those skilled in the art. Such changes and modifications should be construed as included therein unless they depart from the scope of the present invention.

What is claimed is:

1. A method for laminating and bonding flat electrodes, comprising the steps of:
arranging amorphous glass rods and crystal glass rods in parallel relation to each other between a plurality of flat electrodes;
heating and melting said crystal glass rods while said flat electrodes are subjected to pressure, so that said crystal glass rods are re-crystallized and said amorphous glass rods assume a highly viscous state at the melting temperature of said crystal glass rods, to maintain a gap between said electrodes until the crystal glass rods are re-crystallized, whereby said flat electrodes are bonded to the ends of the crystal glass rods and to each other.

* * * * *